Aug. 8, 1944.  J. H. BILLINGS  2,355,042
COUPLER
Filed June 5, 1943  2 Sheets-Sheet 1
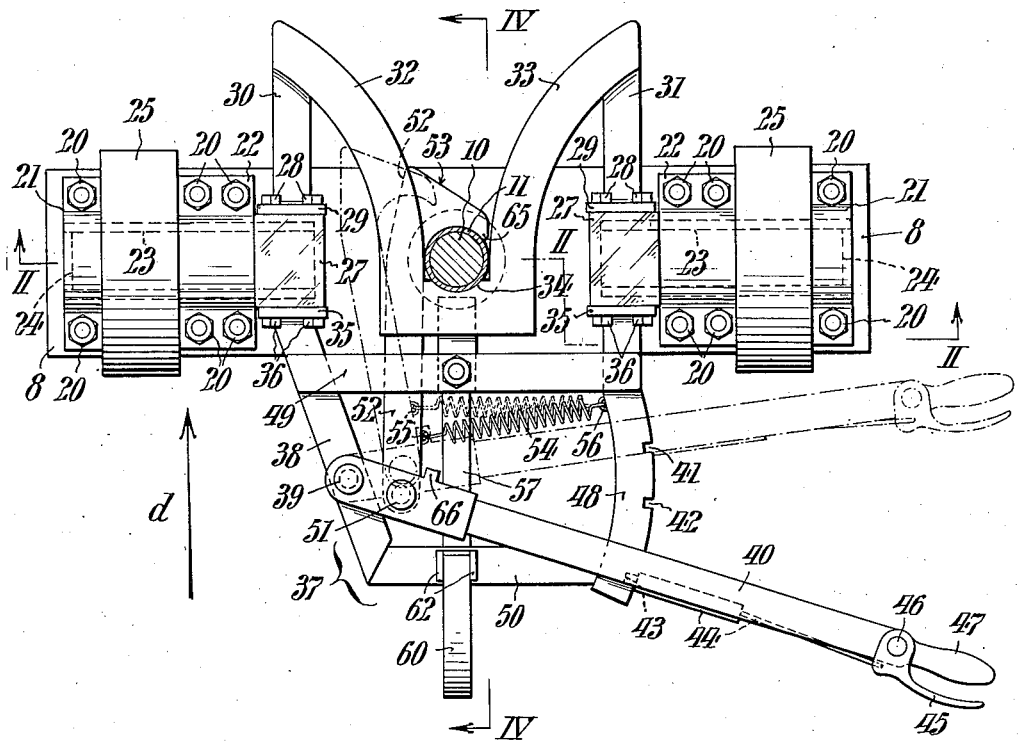
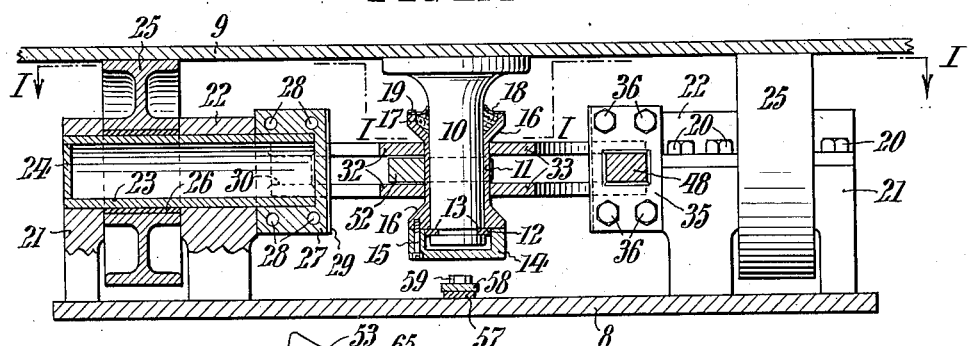
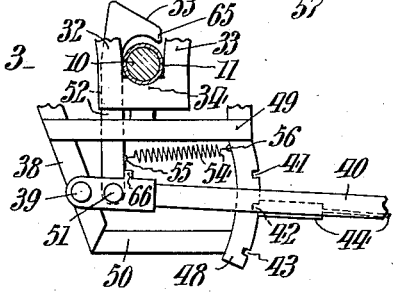
INVENTOR:
John Harland Billings,
BY
ATTORNEYS.

Aug. 8, 1944.   J. H. BILLINGS   2,355,042
COUPLER
Filed June 5, 1943   2 Sheets-Sheet 2
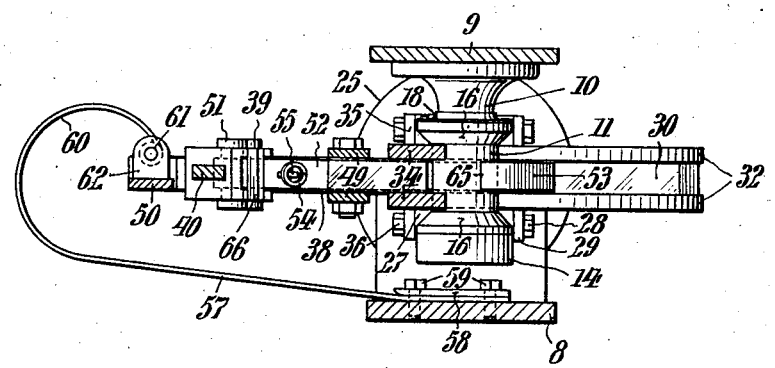
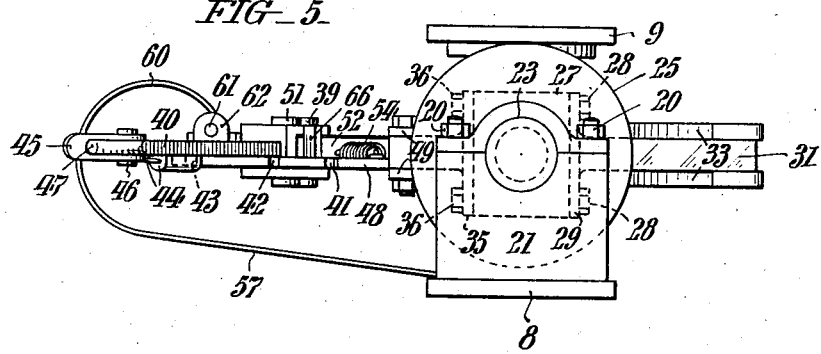
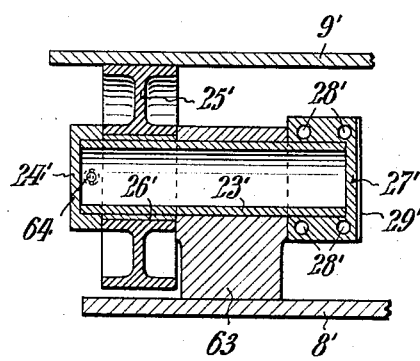
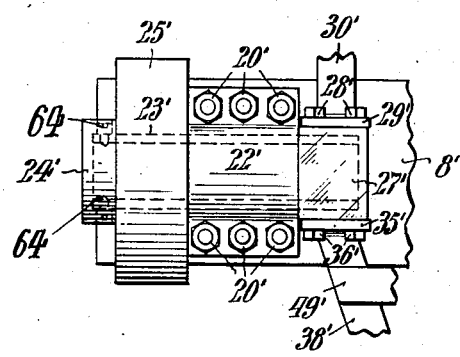
INVENTOR:
John Harland Billings,
BY
ATTORNEYS.

Patented Aug. 8, 1944

2,355,042

UNITED STATES PATENT OFFICE 2,355,042

COUPLER

John Harland Billings, Merion Golf Heights, Pa.

Application June 5, 1943, Serial No. 489,742

8 Claims. (Cl. 280—33.1)

This invention has general reference to means for connecting vehicles in tandem while it relates, more particularly, to a coupler for attaching together a motor driven car and a trailer, or the like; the primary object being to provide a novel device adapted to effect articulate coupling, and uncoupling, but which is positively locked against accidental release when the actual coupling components are in active position.

Another object of this invention is the provision of a simple and comparatively inexpensive, but highly efficient, articulate connection, preferably, for coupling together a motorized vehicle and a conventional trailer, or the like, which at the same time automatically permits relative rocking movements between the truck and trailer when travelling over uneven surfaces, while at the same time positively maintaining an effective connection whenever the vehicles change from draft tension to coasting compression.

A further object is to provide an articulate coupler of the above indicated species in which the coupling elements will never "jam" while making connection, and one which can be readily installed with a minimum expenditure of time and labor.

Other objects, with ancillary advantages, will be evident to those conversant with the art upon a full consideration of the construction, arrangement and operation of the means hereinafter disclosed; but it will also be appreciated that the invention is susceptible of other embodiments and adaptation, or structurally modified forms, coming equally within the terms and scope of the concluding claims.

In the drawings:

Fig. 1 is a plan view taken approximately as indicated by the staggered line I—I in Fig. 2.

Fig. 2 is a vertical section taken on the plane indicated by the angled arrows II—II in Fig. 1.

Fig. 3 is a fragmentary plan view on a smaller scale of the central part of Fig. 1, showing the parts in an intermediate position, and hereinafter fully explained.

Fig. 4 is a vertical section taken approximately as indicated by the angled arrows IV—IV in Fig. 1.

Fig. 5 is an end elevation looking toward the right-hand end of Fig. 1; and,

Figs. 6 and 7 are, respectively, a central vertical section and a top plan view of an alternate form of bearing involved in the coupler device of this invention.

In describing the invention exemplified by the above captioned drawings herewith, specific terms will be employed for the sake of clarity, but it is to be expressly understood the scope of said invention is not thereby limited; each such term being intended to embrace all equivalents which perform the same function for an analogous purpose.

Referring more in detail to the drawings, the reference characters 8 and 9, respectively, designate a fragmentary portion of the rear end of the chassis of a truck, or a base plate for attachment thereto, and the forward portion of a trailer substructure or the draw-bar thereof.

The fifth-wheel axis member 10 is rigidly secured to the underside of the sub-structure or draw-bar 9 of the trailer, and it is fitted with a spool-like sleeve 11, in turn normally supported on a collar or split-ring 12 engaged in a circumferential groove 13, proximate the lower end of said pivot, but afforded a limited degree of vertical movement through the medium of a cap-closure 14 attached to the lower end of the sleeve 11 by circumferentially-spaced screw-studs 15, in an obvious manner. The upper end of the sleeve 11 is conveniently flared at 16 for reception of an appropriate packing 17, which is closed in by a retainer-ring 18, secured on top of the sleeve 11 by removable attaching means 19. The spool-like sleeve 11 is mounted to revolve freely about the axis member 10 and it is held against axial displacement by the split-ring 12; while the removable closure-cap 14 serves as a container for suitable lubricant, not indicated.

Mounted on and rigidly attached to the truck chassis, or a base plate 8 for fixture thereto, as by bolts 20, are a plurality of outer and inner spaced bearings 21, 22, respectively providing oscillatory support for two axially aligned tubular shafts 23, which have their outer ends closed in at 24. On each shaft 23 there is freely mounted a roller 25, preferably fitted with a bushing 26, Fig. 2; while said rollers jointly provide support for the trailer sub-structure or draw-bar 9, in addition to lifting the forward end of the trailer by rolling action when the truck and said trailer are being coupled together.

The inner, or relatively confronting, ends of the shafts 23 are fitted with attached closure-collars 27, preferably of a contour to define opposed flats, the inner ends whereof abut the confronting faces of the bearings 22 aforesaid. Rigidly secured to said collars 27, by screw studs 28 for example, are the flanged ends 29 of vertically-spaced members 30, 31 including inwardly curved guide sections 32, 33 respectively; said sections forming a crotch mutually connected by a stop portion 34, and the purpose whereof will be later on explained.

Conveniently secured by flanges 35 and screw studs 36 to the collars 27, in opposed intermediate planar relation with respect to the spaced members 30, 31 aforesaid, is a yoke comprehensively designated 37, the one straight side portion 38 whereof supports a pivot 39 for a hand-lever 40, and the other side portion being shaped in the form of a segment having notches 41, 42 and 43, for cooperation with a retractible latch means 44. This latch means includes an actuator grasp 45 fulcrumed at 46 proximate the handle end 47 of the lever 40. The yoke side portion 38 and the segment 48 are preferably braced transversely by inner and outer cross ties, 49, 50, respectively; while there is pivoted at 51 to the hand-lever 40 a coupling member or hook 52 embodying a cam slope 53, at its end remote from the pivot 51; said hook being subject to the pull of a helical tension spring 54, conveniently anchored at 55 to the hook 52 and at 56 to the inner edge of the segment 48, in an obvious manner.

A flat spring 57 is securely attached, by a clamp plate 58 and screw studs 59 for example, to the base plate 8, see Figs. 4 and 5 to best advantage; said spring having its other end portion curved-over at 60 and pivotally connected at 61 intermediate spaced lugs 62 projecting from the yoke outer-tie 50. The connection just described serves to normally maintain the yoke 37 and guide sections 32, 33 in substantially horizontal position but, obviously, allows for rocking or oscillatory movement of said parts about the axes of the shafts 23 during travel of the truck and trailer.

Figs. 6 and 7 illustrate an alternate manner of mounting the oscillatable yoke 37 and associated coupler means, and to obviate unnecessary repetitive description, all parts corresponding with those previously explained are similarly designated with an added "prime" exponent. It is to be observed, however, that instead of employing two bearings 21, 22 as before set forth, a single bearing 63 is utilized for support of each shaft 23'; while a closure-cap 24' is secured to the outer end of said shaft by set-screws 64, for example, in order to restrain the relatively outboard roller 25' and associated parts 23', 27' from axial shifting, in an obvious manner.

Having described the structural features of this invention, it will be observed that in the act of coupling a truck and a trailer equipped with the means disclosed, said truck will be usually backed toward the trailer, in the direction indicated by the arrow d, in Fig. 1. The fifth-wheel pin or axis 10 being directed by the curved guide-sections 32, 33, will enter into the crotch between said sections, and come to rest against the stop portion 34. It is also to be here particularly remarked that the hand-lever 40 is provided with a stop projection 66 which enables the coupler-hook 52 being placed and held in the unlatched position, shown by the dot-and-dash line indication of Fig. 1; while it also contacts said hook when the latter is in the neutral position of Fig. 3; whereas the projection 66 is free from engagement with the latch-hook 52 when the hand-lever 40 is in the locked, or full-line position, under pull of the spring 54, so that the trailer pivot 10 cannot become accidentally released from its active or coupling position. Incidentally it is to be particularly noted that, regardless of the position of the hand-lever 40, the pivot-sleeve 11 will never "jam" on the latch-link or coupler-hook 52 as the truck is backed to the trailer for coupling connection. It is furthermore to be also noted that, preparatory to such coupling of the truck and trailer, the hand-lever 40 is moved to the unlatched position designated by the dot-and-dash line showing of Fig. 1 with the latch 44 engaging the notch 41; or said lever may be similarly placed in the neutral position, or engaged with the notch 42, so that, during the actual coupling action the hook 52 can only be displaced sideways, or to the left-hand as viewed in Fig. 1. Incidental to displacement of the hook 52, by coaction with the trailer pivot 10 encountering the hook cam slope 53, said pivot passes the tip 65 of the slope 53, whereupon said hook is snapped toward the right-hand under recoil influence of the spring 54. After this engagement is effected, the hand-lever 40 can be moved to the locked position shown by the full-lines of Fig. 1, with the latch means 44 arrested in the notch 43. It is also to be remarked that after the coupling action is effected, as above explained, no relative movement takes place between the sleeve 11, guide sections 32, 33, the stop portion 34 and the coupling-hook 52; all swivelling being accomplished through rotation of said sleeve 11 about the pivot 10.

From the foregoing the merits and advantages of this invention will be readily apparent to those conversant with the art by virtue of its simplicity and easily fabricated character; while it is obviously of a character unlikely to get out of order. The formation of the guides 32, 33 is such that the act of engaging therewith of the fifth-wheel pivot 10 is easily effected, and no matter from what direction said pivot enters the guides, automatic coupling results; while locking of the coupling is positively assured by a simple movement of the hand-lever 40 with a minimum of effort. Furthermore it is equally apparent that the details of construction may be varied, without departing from the fundamentals of the invention as more particularly defined in the following claims.

Having thus described my invention, I claim:

1. A coupler for articulately connecting a power actuated truck and a trailer comprising an oscillatable guide-and-yoke device; spaced bearings for rigid support of such device by one of the vehicles; a pivot carried by the other vehicle for engagement in the guide portion of said device; a tension-influenced latch member with a hook supported by the guide-portion of the device to effect automatic engagement of the coupler; manipulator means fulcrumed to the yoke-portion of the oscillatable device and having pivotal connection to the latch member for release of the latter; and means for locking the latch member hook in active connection with the pivot aforesaid.

2. A coupler for articulately connecting a motor vehicle and a trailer, comprising a pivot preferably rotatable in horizontal plane and supported by the trailer; spaced supports carried by the motor vehicle and respectively affording rigid bearing for axially aligned shafts; a freely-rotative roller on each shaft jointly affording bearing for the forward end of the trailer; a guide-and-yoke device supported by the inner ends of the aligned shafts and oscillatable thereon; a hand-lever fulcrumed to the yoke-portion of the oscillatable device with pivotal connection to a latch member, said member being laterally movable in the guide-portion of said oscillatable device; retractible means carried by the hand-lever for coaction with selective notches in a segment of the yoke portion for respectively releasing, latching, and locking the latch member to the trailer pivot aforesaid; and means whereby, regardless of the position of the latch member, the pivot aforesaid can never jam on the latch member during coupling of the motor vehicle and trailer.

3. A coupler for articulately connecting a motor vehicle and a trailer comprising a vertical pivot, rotatable in a horizontal plane, and preferably supported by the trailer; pairs of spaced supports carried by the chassis of the motor vehicle and respectively affording rigid bearing for two axially aligned shafts; a freely-rotative roller on each said shaft adapted to jointly raise and afford bearing for the forward end of the trailer; a guide-and-yoke device supported by the inner ends of the aligned shafts and oscillatable thereon; a hand-lever fulcrumed to the yoke-portion of the oscillatable device; a latch member, pivoted at one end to the hand-lever and embodying a coupling hook-section with a cam slope at the other end, said latch member being laterally movable in the guide-portion of the oscillatable device; retractible means carried by the hand-lever for coaction with selective notches in a segment of the yoke-portion of the oscillatable device, for respectively releasing, latching and locking, the latch member to the trailer pivot; tension means intermediate the latch member and yoke-portion of the oscillatable device influencing said member into coaction with a stop projection on the hand-lever whereby the hook-section of such member is positively restrained from becoming jammed by the trailer pivot during the coupling operation; and means serving to normally maintain the guide-and-yoke device in substantially horizontal position.

4. A coupler, as defined in claim 3, wherein the vertically rotatable pivot comprises a rigidly mounted axis member, a spool-like sleeve on said axis member, a collar engaged in a groove in the axis member supporting said sleeve, a cap-closure attached to the lower end of the sleeve serving to contain lubricant while affording a limited degree of axial movement for said sleeve, and packing in the upper end of the sleeve closed in by a retainer ring.

5. A coupler, as defined in claim 3, wherein the respective pairs of bearings for rigid support of the guide-and-yoke device each include inner and outer units jointly providing oscillatory support for a tubular shaft having the outer end closed in, a roller rotatively mounted on said shaft intermediate the bearing units, and a closure of a shape to define opposed flats rigidly secured to the inner end of said shaft.

6. A coupler, as defined in claim 3, wherein the pair of bearings for rigid support of the guide-and-yoke device each comprise a unit affording oscillatory support for a tubular shaft, a closure of a shape to define opposed flats rigidly secured on the inner end of said shaft, a roller freely mounted on the out-board portion of said shaft, and a closure-cap adjustably attached over the outer end portion of said shaft to restrain the latter from axial shifting.

7. A coupler, as defined in claim 3, wherein the guide-and-yoke device comprises vertically-spaced members having flanged attaching ends and includes inwardly-curved guide sections jointly forming an intervening crotch or stop portion; a planarly related yoke having flanged attaching ends, said yoke including straight and segmental side portions with intervening tie means; and means whereby the respective flanged ends of the vertically-spaced members, as well as the corresponding ends of the yoke side-portions, are attached oscillatably in opposed relation to the ends of the shafts.

8. A coupler, as defined in claim 3, wherein the means to normally maintain the guide-and-yoke device in substantially horizontal position comprises a flat-spring having one end clamped to a stationary part of the truck, and the curved-over other end is pivotally attached to the yoke-portion of the device aforesaid.

JOHN HARLAND BILLINGS.